April 26, 1960        E. SCHNITZER        2,934,175

BAND PASS SHOCK STRUT

Filed May 15, 1956        3 Sheets-Sheet 1

INVENTOR
EMANUEL SCHNITZER

BY
ATTORNEYS

April 26, 1960  E. SCHNITZER  2,934,175
BAND PASS SHOCK STRUT

Filed May 15, 1956  3 Sheets-Sheet 2

INVENTOR
EMANUEL SCHNITZER

BY
ATTORNEYS

April 26, 1960        E. SCHNITZER        2,934,175

BAND PASS SHOCK STRUT

Filed May 15, 1956        3 Sheets-Sheet 3

INVENTOR
EMANUEL SCHNITZER

BY

ATTORNEYS

United States Patent Office 2,934,175
Patented Apr. 26, 1960

2,934,175

BAND PASS SHOCK STRUT

Emanuel Schnitzer, Newport News, Va.

Application May 15, 1956, Serial No. 585,128

5 Claims. (Cl. 188—96)

(Granted under Title 35, U.S. Code (1952), sec. 266)

The invention described herein may be manufactured and used by or for the Government of the United States of America for governmental purposes without the payment of any royalties thereon or therefor.

This invention relates to band pass shock absorbers and, more particularly, to shock absorbers of this type which function successfully to absorb shock forces operating in either or both of two opposed directions.

In copending application Serial No. 528,563, filed August 15, 1955, now U.S. Patent No. 2,866,633, issued December 30, 1958, of which this application is a continuation-in-part, a single action band pass shock absorber was shown and described in which telescoping cylinders containing a fluid and appropriate valves were interposed between a force and a mass, as between the body and wheel of an airplane, the fluid flow between cylinders being so controlled that, for interactions between the body and wheel of a selected band of frequencies, the absorber behaved as the conventional cylinder fluid piston absorber, but for other selected frequency bands the absorber filtered out the shock disturbance, thus preventing injurious body shocks.

While such a single action absorber has wide uses, particularly in the field of vehicles, for certain conditions, as in many machine applications, it is desirable that the shock absorber between massive parts be double acting.

It is therefore, an important object of the present invention to provide shock absorber structure which will act with equal or proportional facility in opposite directions of movement between opposing forces.

An object, also, is to provide double acting shock absorber mechanism which may be made normally operable for selected bands of frequencies but capable of attenuating shocks of frequencies external to the selected bands.

An additional object of the invention is to provide double acting shock absorbing mechanism which is not only selective as to shock frequency but is capable of adjustment as to amount of damping and phase so that mechanism adequate to the specific mechanical problem may be built into the equipment.

An object, also, is the provision of frequency discriminating shock absorbers utilizing hydraulic, mechanical friction or electromagnetic types of damping or of damping control.

Other objects pertain to the provision of a shock absorber with means for sensing the instantaneous difference between the input and output loading functions of the absorber, and transmitting this difference as a workable signal to be utilized for damping control; the provision of means for modifying a given selected group of frequencies, as by filtering, so that the desired type of damping characteristic can be developed; and the provision of means for amplifying or converting the transmitted signal to the proper form for damping control.

Other objects and many of the attendant advantages of this invention will be readily appreciated as the same becomes better understood by reference to the following detailed description when considered in connection with the accompanying drawings wherein.

Figure 1:
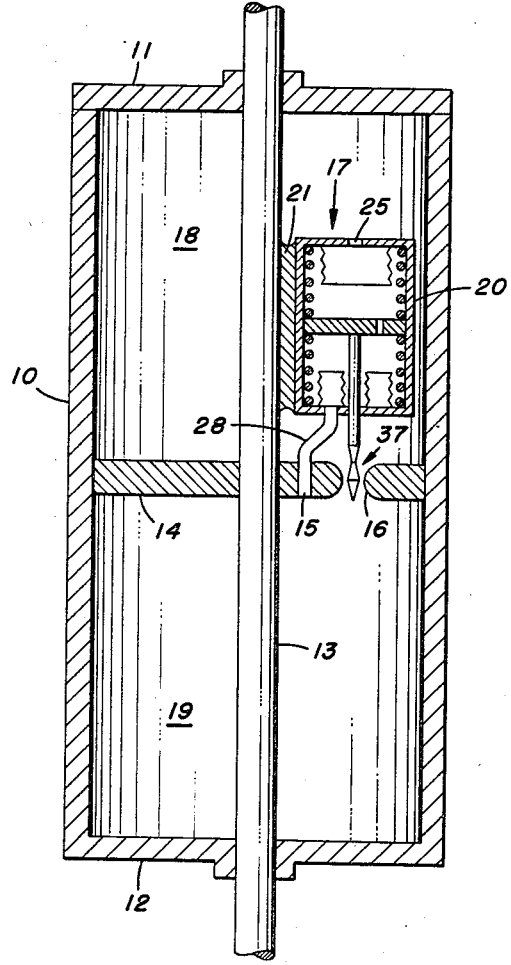
Fig. 1 is a sectional view in elevation showing a form of the shock absorber suitable for low frequency band pass operation.

Reference is made to Fig. 1 for illustration of hydraulic apparatus for double-action control of shock between movable bodies or objects. In this figure is shown a cylinder 10 with ends 11 and 12 closed except for openings for the piston rod 13, which, at the center of the cylinder, is fixed to transverse piston 14. In use, the cylinder 10 is attached to one movable object and the piston rod 13 to another relatively movable object, as for example, to relatively movable machine parts.

The piston 14 is provided with two apertures 15 and 16, 15 being a fluid transfer duct to the control unit 17, as will be later described, and aperture 16 a main opening between the chambers 18 and 19 formed in the cylinder 10 by piston 14. This aperture 16, preferably, has a convexly rounded wall so that the point of minimum diameter thereof is midway from end to end of the aperture.

The control unit 17 is in the form of a vertically positioned cylinder 20 of reduced size so that it may be attached to the piston rod 13, as by spacing plate 21, and have ample displacement from the cylinder 10 for movement with the piston 14. This cylinder 20 has sealed ends except for a single duct 25 at the upper end thereof and a duct 26 and, also, an opening 27, at the lower end. The duct 26 is connected to aperture 15 by tube 28. Inside the cylinder 17 are two differential pressure chambers 30 and 31, with corrugated expansible walls, chamber 30 being in drum form and attached to cylinder end 32 around the duct 25 so as to have a single outlet at this duct, and chamber 31 being ring-shaped with a single outlet at duct 26.

The expansible chambers 30 and 31 are relatively of small depth so that ample space exists in the cylinder for control piston 35. This piston at its edge engages the inner cylinder wall and is provided on its lower side with a piston rod 36 which extends through lower cylinder opening 27 to a point adjacent the aperture in main piston 14, the control cylinder 17 being positioned directly above this aperture. At the lower end of the piston rod 36 is secured a valve 37 formed of two cone-like shaped sections, section 38 forming a terminating cone point and section 39 abutting section 38 at the base and, short of its point termination, forming a connection with the tapering juncture 40 at the end of piston rod 36. It is apparent that the junction of cone sections 38 and 39 at their bases forms an annular line 41 of maximum enlargement, this line 41 normally being at the mid-point of aperture 16 where the aperture area is minimum. This normal position of the valve determines the uncontrolled flow of fluids between main cylinder spaces 18 and 19.

The valve 37 is held in the described normal position by means of coil springs 43 and 46, each spring extending under some compression from the piston 35 to the adjacent cylinder end. A duct 47 is formed through the control piston 33 of a diameter less than that of ducts 25 and 26 and of such capacity that it will transmit a slow flow of liquid without blocking, whereas a rapid flow is effectively blocked.

The main cylinder 10 is completely filled with a suitable liquid, such as oil, which penetrates the control cylinder through ducts 25 and 26 to fill expansible chambers 30 and 31. Control cylinder 17 between chambers 30 and 31 is also filled with liquid, a free passage between opposite sides of the piston being afforded by duct 47.

The operation of the low band pass hydraulic shock absorber as above-described is as follows: Under conditions of movement between the objects to which the absorber elements are attached, at a low rate of change, there will be pressure on one side of main piston 14 in excess of that on the other side, as, for example, excess pressure in cylinder space 19, due to the downward movement of the main piston. As a result, liquid will flow upwardly through aperture 15 and a higher pressure will be communicated to pressure chamber 31 than to pressure chamber 30 resulting in a tendency to lift control piston 35 and accordingly valve 37. However, due to the slow rate of pressure change, liquid in control cylinder 17, below the piston, flows through the piston duct, thus tending to equalize the pressure on both sides of the piston without movement of the piston against the force of coil springs 43 and 44. As a result, for the case of a low band of frequencies the flow area of aperture 16 remains relatively constant at its minimum flow value with the valve in a state of equilibrium.

A different situation develops, however, when the rate of load disturbance is rapid. In this case, the pressure differential between chambers 30 and 31, in the control cylinder, builds up so rapidly that duct 47 is unable to equalize the liquid pressures in the time of the disturbance and as a result the piston moves upwardly, thereby opening the flow area in main piston valve aperture 16 and thus permitting rapid equalization of pressures on both sides of main piston 14 and restoration of valve 37 to its normal median value in aperture 16. It is thus, apparent that for the low pass band of shock disturbances between the movable objects, the apparatus behaves as an ordinary piston cylinder shock absorber with or without a fixed piston aperture, but that in the higher frequency ranges the apparatus filters out all disturbances, thus permitting a selection of ranges in the frequency spectrum in which certain loads of motions are to be damped. It is pointed out that by use of the double cone valve 37 in conjunction with the differential chambers 30 and 31 the apparatus functions equally for either direction of relative movement between the objects. Also, as an aid to recycling the absorber between high frequency pulses applied in one direction only, as in an automobile suspension, an inward opening, spring-loaded dump valve, with an orifice through it, may be included in ducts 25 or 26, as indicated in the piston valves of applicant's copending case hereinabove referred to.

Figure 2:
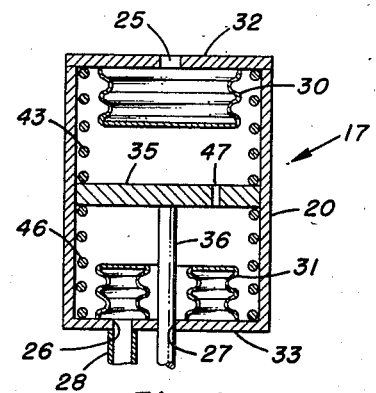
Fig. 2 is an enlarged sectional view of the control unit as used in Fig. 1.
Figure 4:
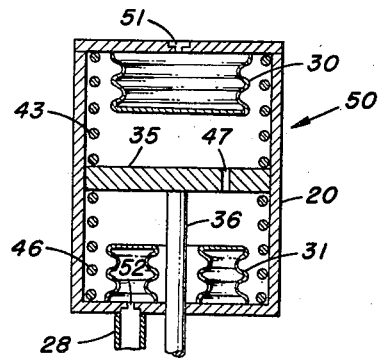
Fig. 4 is a modification of the control unit of Fig. 1 applicable to double-action high-low band pass absorbers.

Modification of the structure of Figs. 1 and 2 may be made to secure shock absorber application to high, high-low, or intermediate ranges of frequencies or rates of application of load or other types of input functions. Fig. 4 illustrates, for example, a modification of the control cylinder as applied to the structure of Fig. 1 to secure double-action high-low band pass absorption. In this figure, the control cylinder 50 is identical to control cylinder 17 with two exceptions, duct 51 is substituted for duct 25 and duct 52 for duct 26, ducts 51 and 52 having a cross-section similar to that of control piston duct 47 of such value that blocking occurs under rapid rates of flow. In operation, a low frequency impulse upward on main piston rod 13 forces liquid through the main piston aperture 16 and through orifices 51 and 52 into pressure chambers 30 and 31 at such speed as to permit pressure equalization on control piston 35 and a constant opening at metering valve 37. Also, for high frequency loads, the constricted ducts 51 and 52 are able to transmit practically no liquid in the pressure period and hence the valve 37 remains at equilibrium. In the intermediate range, however, pressures are communicated to the control piston 35 which moves to open the main metering valve 37 and thus attenuate the shock.

Figure 5:
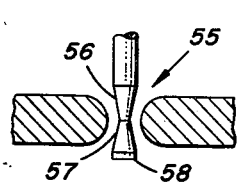
Fig. 5 is a detail of the main valve as applied to the arrangement including the control unit of Fig. 4 to obtain an intermediate frequency band pass absorber.

To obtain an intermediate frequency band pass shock absorber of the general construction of Fig. 1, with the control unit 50 of Fig. 4, it is necessary only to substitute for valve 37 the valve arrangement 55 of Fig. 5. In this valve the cone sections 56 and 57 are reversed so as to be point to point, the base 58 of cone section 57 forming the valve terminal. With this valve form it is apparent that high and low frequency disturbances will be attenuated, the valve remaining in equilibrium, whereas at intermediate frequencies the control piston 35 will move to permit normal shock absorber action.

Figure 3:
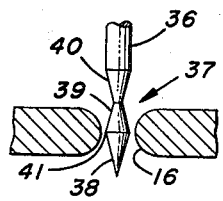
Fig. 3 is a detail of the valve structure in the main piston of Fig. 1.
Figure 6:
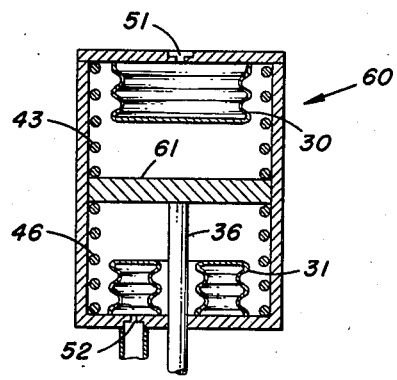
Fig. 6 is another modification of the control unit in the arrangement of Fig. 1 suitable for a high frequency band pass absorber.

A variation of the Fig. 4 control unit is shown in the control unit 60 of Fig. 6, wherein the piston 61 is free of openings. With this construction, the control, when applied to the structure of Figs. 1 and 3, functions as a high frequency load band pass shock absorber. This arises from the fact that, at low and intermediate frequencies, pressures are transmitted to the piston 61 to move the main piston valve 37 and thus attenuate shock transmission whereas with high frequencies pulses the valve 37 is held in equilibrium.

Figure 7:
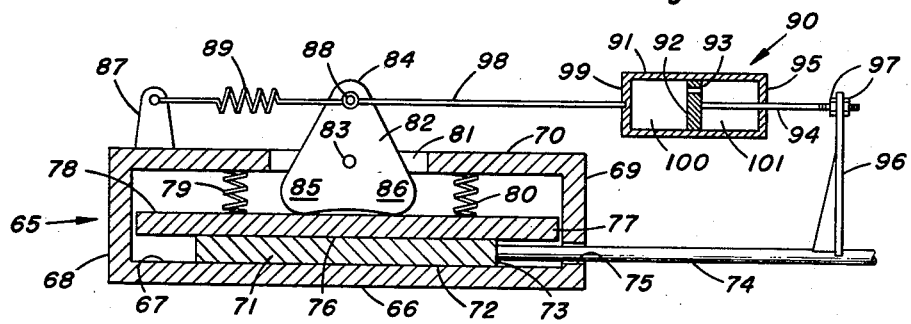
Fig. 7 is a view in section of a high pass shock absorber using friction forces between the coacting moving objects.

As described to this point the application of the principles of frequency band selection in shock absorbers has been made to hydraulic apparatus. However, these principles may well be applied to other forms of power transmission. In Fig. 7, for example there is shown a shock absorber of the friction type, the control device operating to modify the friction between reciprocating elements. In this form the receiver is shaped as a strut in the form of a flattened rectangular box 65 having a flat base 66, the upper surface of which serves as a friction surface 67, side walls 68 and 69, and top wall 70. Slidably movable in said box 65, which may be referred to as the receiver, is a plunger 71, the lower surface 72 of which is adapted to engage the friction surface 67 of box base 66. At one edge 73 of this plate a plunger rod 74 is attached which projects externally of the box through box side opening 75. Above plunger 71, which is in the form of a flat plate having friction surfaces 72 and 76, is a third friction plate 77, this plate being free to move up and down but restrained from side movement by the box walls, a friction surface 76 being formed on the lower plate surface. Coil springs 79 and 80 extending between the plate 77 and top wall 70 of the box adjacent the plate ends serve normally to reduce the friction load on plunger 71 due to the weight of plate 77.

In a slot 81 formed in the center of box top 70, a cam 82, of approximately triangular shape, is mounted for pivotal movement on pin 83, extending between the slot edges. This cam 82 is of such size that when the line through the cam pivot pin 83 and apex 84 is vertical the other two apexes 85 and 86 rest on friction plate 77 against the slight tension of springs 79 and 80 and plunger 71 has minimum frictional contact with this plate and base plate 66. As shown, the lower apexes 85 and 86 are rounded to permit easy camming action against plate 77 on cam rotation.

A spring connection lug 87 is formed adjacent one end of the box top 70 and between this lug and a pin 88 in cam apex 84 a combined tension and compression spring 89 is placed. In line with this spring on the opposite side of the apex, and in the plane of movement of the cam is a control unit 90. This unit includes a cylinder 91 closed at both ends, and a piston 92 movable therein, the cylinder being filled with a fluid and the piston having a duct or orifice 93, of small diameter relative to the size of the piston, passing through the piston to permit transfer of fluid from one side of the piston to the other on piston movement. A piston rod 94 connects the piston through cylinder end wall 95 to a standard 96 to which it is fixed as by screw nuts 97, the standard at its base being attached to and movable with the plunger rod 74. The rod 98 connects cam pivot pin 88 to cylinder end 89. In operation, the plunger rod 74 is fixedly secured to one movable object and the friction box 65 to the other relatively movable object.

The arrangement of Fig. 7 is adapted for use as a high band pass shock absorber. If a low rate of loading be assumed in such direction that plunger 71 is pushed toward the friction box, the plunger connected piston rod 94 moves the piston 92 to the left at such a slow rate that fluid is able to pass from region 100 to region 101 through duct 93 with negligible restraint, an ineffective amount of force being transmitted to the cylinder and to connected cam 82. As a result, spring 89 holds cam 82 in the neutral, low friction position and the shock absorber, therefore, does not transmit or damp the load pulse. On the other hand, where there is a high rate of loading, fluid cannot bleed through orifice 93 fast enough to prevent the approach of a locked condition between the cylinder and piston, resulting in cam actuation to increase the compression and resulting frictional force between the friction plates 66 and 77 and plunger 71. When the direction of motion is reversed the cam action is reversed with the same effects. In cases where the frequency range of load application is very large, it may be necessary to insert a combined compression tension spring between rod 98 and cam 82, of the type shown in Fig. 8 with relatively greater stiffness than that of spring 89, to prevent the establishment of large forces in the control system of this type of shock absorber.

Figure 8:
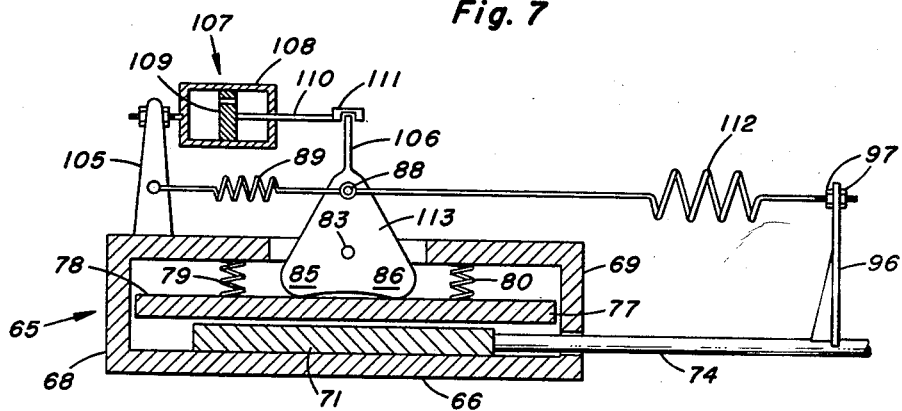
Fig. 8 is a modification of the friction arrangement of Fig. 7 suitable for use for low band pass absorption.

The high band pass shock absorber of Fig. 7 may be converted to a low pass absorber in several ways. One example is shown in Fig. 8 where the spring lug 87 of Fig. 7 is enlarged to form the lug 105 of Fig. 8 and the cam apex 84 of Fig. 7 is extended by stem 106 in Fig. 8 in cam 113 to form terminal connections for the control unit 107 of the type shown as 90 in Fig. 7. As shown, a cylinder 108 with closed ends has one end fixed to lug 105 and an apertured piston 109 is connected by piston rod 110 and pivotal connection 111 to the cam stem 106. Also, in place of control unit 90 between the cam and plunger a stiff spring 112, as referred to hereinabove in connection with Fig. 7, is inserted. The spring 89 and friction plunger receiver unit remain the same as in Fig. 7. With this arrangement, at low frequencies the control unit acts as an open link, leaving the cam free to move and thus causing shock absorption whereas at high frequencies the control unit approaches a locked condition so that the cam remains in its neutral low friction producing position.

Figure 9:
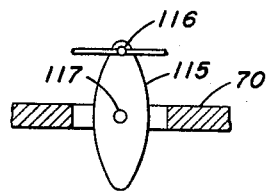
Fig. 9 is a detail of a varied cam structure applicable to the arrangement of Fig. 7 to obtain low band pass absorption.

An alternative method for converting the arrangement of Fig. 7 to a low pass absorber is to replace cam 82 by cam 115, as shown in Fig. 9, this cam being of approximate elliptical form with the spring 89 and control rod 98 connected to pivot pin 116 at the top focal section, the cam being pivotally mounted in the box top by pin 117 at the cam center. The normal position of this cam is with its long axis vertical so that there is maximum friction between the plunger and receiver elements, and it is maintained in this position during low frequency pulses as will appear from the description of Fig. 7. At high frequency pulses, however, the cam is rotated thus attenuating the shock.

Figure 10:
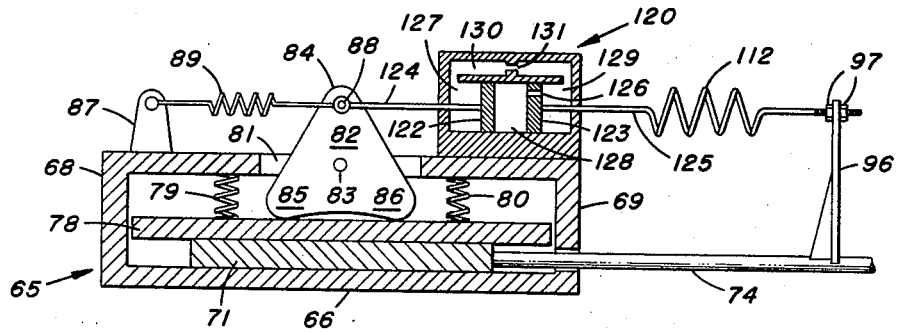
Fig. 10 illustrates the structure modification of Fig. 7 suitable for an intermediate band pass shock absorber.

Fig. 10 illustrates a modification of Fig. 7 for application to intermediate frequency pulsations. In this arrangement the parts are identical to those of Fig. 7 with the exceptions that the control unit 90 is replaced by a modified control unit 120 and spring 112, which is stiff in comparison with spring 89, connected in series relation between the cam pivot pin 88 and plunger standard 96. In this construction the control unit 120 is provided with two pistons, 122 and 123, piston 122 connecting with pivot 88 by rod 124 and piston 123 connecting with the spring 121 by means of rod 125, the spring connecting to standard 96. Piston 122 is free of openings while piston 123 is provided with an aperture 126. The two pistons divide the piston space into three regions indicated at 127, 128 and 129, regions 127 and 129 being connected by the passage 130. A restrictive aperture 131 in this passage offers less impedance to fluid flow between regions 127 and 129 than the impedance offered by duct 126 in piston 123.

In using this apparatus for low frequencies, fluid flows easily through duct 126 so that negligible force is exerted on piston 122 and spring 89 is able to maintain cam 82 in its neutral low friction position. For intermediate frequencies, duct 126 permits a fluid flow which is small for the pressures exerted and hence piston 122 is actuated since liquid can flow through passage 130. For high frequencies, both apertures 126 and 131 offer high impedance to fluid flow so that no motion of cam 82 can occur.

Figure 11:
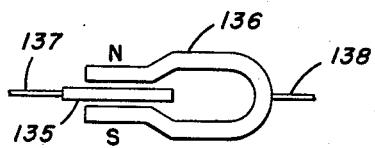
Fig. 11 is a detail illustrating the application of electromagnetic means to selective shock absorption.

The general method of damping control for shock absorbers as previously described lends itself, also, to electromagnetic methods. Fig. 11 illustrates one method of power translation of this type wherein a low resistance non-magnetic electrically conducting bar 135 is adapted for movement between the poles of a permanent magnet 136. At low frequencies the magnetic drag on bar 135 is small so that relatively little coupling exists between plunger 137 and receiver 138; while at high frequencies the coupling is much tighter so that rods 137 and 138 are almost rigidly connected. This is due to the fact that, proportional to the relative velocity, eddy currents are set up in the bar producing a magnetic force opposing relative motion between the bar and magnet. The arrangement of Fig. 12 utilizes this principle in the electromagnet 140, having adjacent pole ends 141 and a low resistance non-magnetic bar 142 slidably mounted between said poles. Power is supplied the magnet from the source 143 through electric amplifier 144. A non-magnetic support rod 145 is fixed to the electromagnet, the rod at its end being attached to the highly permeable core 146 of the coil 147 forming part of a shock rate of application and frequency sensing element 148. This core, which may be cylindrical in shape, is normally positioned between the poles of permanent magnet 149. The terminals of coil 147 are connected to a filter network 150 which is adjustable according to known procedures to pass desired frequencies. The signal input generated in coil 147 and filtered in network 150 is then fed into the amplifier 144 where it is amplified and utilized to modulate the power supplied to the electromagnet, thereby modulating the electromagnetic effects between the magnet and bar 142. Thus by adjustment of filter components any desired damping effects may be obtained.

Figure 12:
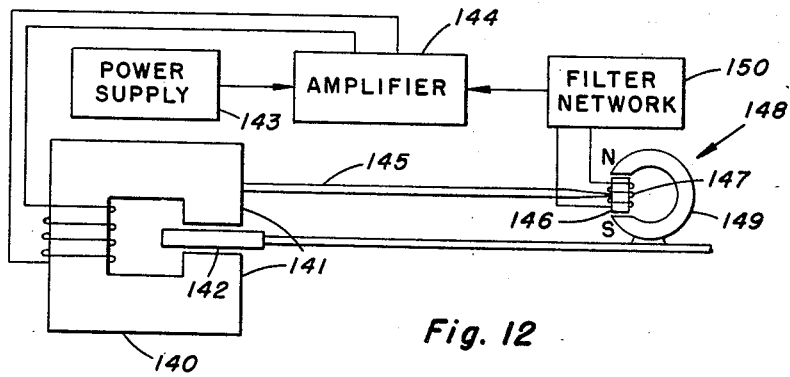
Fig. 12 is a further modification showing use of electromagnetic means to absorb shock in selected frequency bands; and, Fig. 13 is a variation on the arrangement of Fig. 12.
Figure 13:
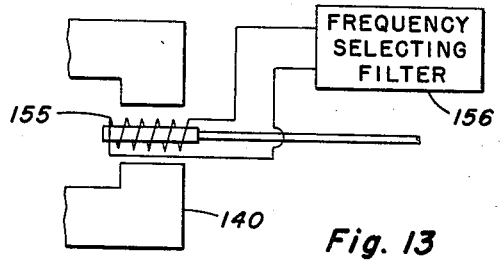

It is also possible to simplify the shock absorber or vibration damper of Fig. 12 by substituting a permanent magnet for electromagnet 140 and a wire wound armature with a highly permeable core for the bar 142 with a frequency selective type of short circuiting filter network connected across the armature terminals. In this way, the motion pickup amplifier and power source, including elements 143 through 150 of Fig. 12, may be omitted, the arrangement being shown in Fig. 13, where the armature and filter are indicated by numerals 155 and 156, respectively. With this revised construction for the forcing frequency ranges in which the filter approaches a short circuit or low electrical impedance, the circulating current in the armature winding induced by the relative motion between armature and permanent magnet would create a damping force opposing the motion. Over the remainder of the frequency spectrum, the filter would present a high impedance, reducing the armature current to such a low value that relatively little damping force would be exerted between the permanent magnet and armature.

Obviously many modifications and variations of the present invention are possible in the light of the above teachings. It is therefore to be understood that within the scope of the appended claims the invention may be practiced otherwise than as specifically described.

What is claimed is:

1. A double acting low band pass shock absorber adapted for connection between movable objects both of which are subject to shock force applications, comprising a closed cylinder attached to one of said objects; a piston rod attached to the other of said objects and mounted for sliding movement through at least one end of said cylinder; a main piston within said cylinder fixed to said rod and movable therewith, said piston dividing said cylinder into two main compartments and having first and second apertures formed therein, the second aperture being formed with a convexly surfaced wall; a control cylinder mounted on said piston paraxially with said main cylinder, the end of said control cylinder farthest from said piston being closed except for a single duct therein and the end of said control cylinder adjacent said piston being closed except for two ducts; a connecting tube between one of said control piston two ducts and said first aperture of the main cylinder piston; a piston movable within said control cylinder having a single aperture therethrough of a diameter less than that of said single duct and dividing said control cylinder into two compartments; a piston rod connected to said control cylinder piston, said piston extending through the other of said control piston two ducts; a valve at the exposed end of said control piston consisting of a member having a conical tip with a reversed conical taper adjacent the tip forming an enlargement adapted to be positioned medially within the convex area of said main piston second aperture; a first flexible expandable container mounted within said control cylinder in communication only with said control cylinder single duct; a second flexible expandible container mounted within said control cylinder in communication with said connecting tube; and a liquid filling said main and control cylinders, said control piston valve being movable by said control piston to vary the area of the fluent passage for liquid between said main compartments.

2. A double acting high-low band pass shock absorber adapted for connection between movable objects both of which are subject to shock force applications, comprising a closed cylinder attached to one of said objects; a piston rod attached to the other of said objects and mounted for sliding movement through at least one end of said cylinder; a main piston within said cylinder fixed to said rod and movable therewith, said piston dividing said cylinder into two main compartments and having first and second apertures formed therein, the second aperture being formed with a convexly surfaced wall; a control cylinder mounted on said piston paraxially with said main cylinder, the end of said control cylinder farthest from said piston being closed except for a single duct therein and the end of said control cylinder adjacent said piston being closed except for two ducts; a connecting tube between one of said control piston two ducts and said first aperture of the main cylinder piston; a piston movable within said control cylinder having a single aperture therethrough of a diameter less than that of said single duct and dividing said control cylinder into two compartments, said single duct and the one of said two ducts leading into said connecting tube having a diameter of approximately the same order as that of the control piston aperture; a piston rod connected to said control cylinder piston, said piston extend through the other of said control piston two ducts; a valve at the exposed end of said control piston consisting of a member having a recess shaped approximately as right circular cones joined tip to tip, the tip junction normally lying at the medial point of said main piston second aperture; a first flexible expandable container mounted within said control cylinder in communication only with said control cylinder single duct; a second flexible expandable container mounted within said control cylinder in communication with said connecting tube; and a liquid filling said main and control cylinders, said control piston valve being movable by said control piston to vary the area of the fluent passage for liquid between said main compartments.

3. A double acting high frequency band pass shock absorber adapted for connection between movable objects both of which are subject to shock force applications, comprising a closed cylinder attached to one of said objects; a piston rod attached to the other of said objects and mounted for sliding movement through at least one end of said cylinder; a main piston within said cylinder fixed to said rod and movable therewith, said piston dividing said cylinder into two main compartments and having first and second apertures formed therein, the second aperture being formed with a convexly surfaced wall; a control cylinder mounted on said piston paraxially with said main cylinder, the end of said control cylinder farthest from said piston being closed except for a single duct therein and the end of said control cylinder adjacent said piston being closed except for two ducts; a connecting tube between one of said control piston two ducts and said first aperture of the main cylinder piston; a piston movable within said control cylinder, and dividing said control cylinder into two compartments, said single duct and the one of said two ducts leading into said connecting tube having a reduced diameter readily passing cylinder fluid at low and intermediate bands of frequencies but restraining fluid flow at high frequencies; a piston rod connected to said control cylinder piston, said piston rod extending through the other of said control piston two ducts; a valve at the exposed end of said control piston consisting of a member having a conical tip with a reversed conical taper adjacent the tip forming an enlargement adapted to be positioned medially within the convex area of said main piston second aperture; a first flexible expandable container counted within said control cylinder in communication only with said control cylinder single duct; a second flexible expandable container mounted within said control cylinder in communication with said connecting tube; and a liquid filling said main and control cylinders, said control piston valve being movable by said control piston to vary the area of the fluent passage for liquid between said main compartments.

4. A double acting shock absorber adapted for connection between two movable objects either or both of which are subject to force applications, comprising a closed main cylinder attached to one of said objects, a main piston rod attached to the other of said objects and mounted for sliding movement through at least one end of said main cylinder, a main piston within said main cylinder fixed to said main piston rod and movable therewith, main piston movement damping means comprising a fluid completely filling said main cylinder and an aperture through said main piston for passage of said fluid to either side of said main piston, means for sensing rate of change of fluid pressure differential between opposite sides of said main piston comprising a control cylinder having closed ends positioned within said main cylinder and attached to said main piston rod adjacent one side of said main piston; single ducts in both ends of said control cylinder; a tubular connection between one of said control cylinder end ducts and the other side of said main piston; an expansible closed chamber connected to the area around each of said ducts at each end of and within said control cylinder forming a central cylinder space for piston movement; a liquid completely filling said control cylinder central cylinder space; a control cylinder piston centrally positioned in said control cylinder central cylinder space and movable therein; a control cylinder piston rod fixed to said control cylinder piston and mounted for sliding movement through the end of said control cylinder adjacent said main piston, said control cylinder piston rod having a free end positioned adjacent said main piston aperture; damper modifying means comprising a valve element attached to the free end of said control cylinder piston rod and movable therewith, said valve element being positioned in said main piston aperture and movable to vary the volume of fluid flow through said main piston; means for restricting movement of said control cylinder piston in response to rates of change of pressure differential between opposite sides of said main piston operable only within a preselected range of said rates of change; and means for variably limiting said control cylinder piston movement to a distance compatible with any given rate of change of pressure differential within said range.

5. The double acting shock absorber as defined in claim 4 with said control cylinder piston movement restriction means including an aperture formed through said control cylinder piston, and said control cylinder piston movement limiting means comprising spring devices within said control cylinder between said control cylinder piston and each control cylinder end, said spring devices having predetermined elastic forces compatible with the selected range of said rates of change, and said aperture giving rise to hydraulic pressures upon said control cylinder piston compatible with said selected range of said rates of change.

References Cited in the file of this patent

UNITED STATES PATENTS

| | | |
|---|---|---|
| 1,282,712 | Barrell | Oct. 22, 1918 |
| 1,535,538 | Maxfield et al. | Apr. 28, 1925 |